Patented Feb. 22, 1944

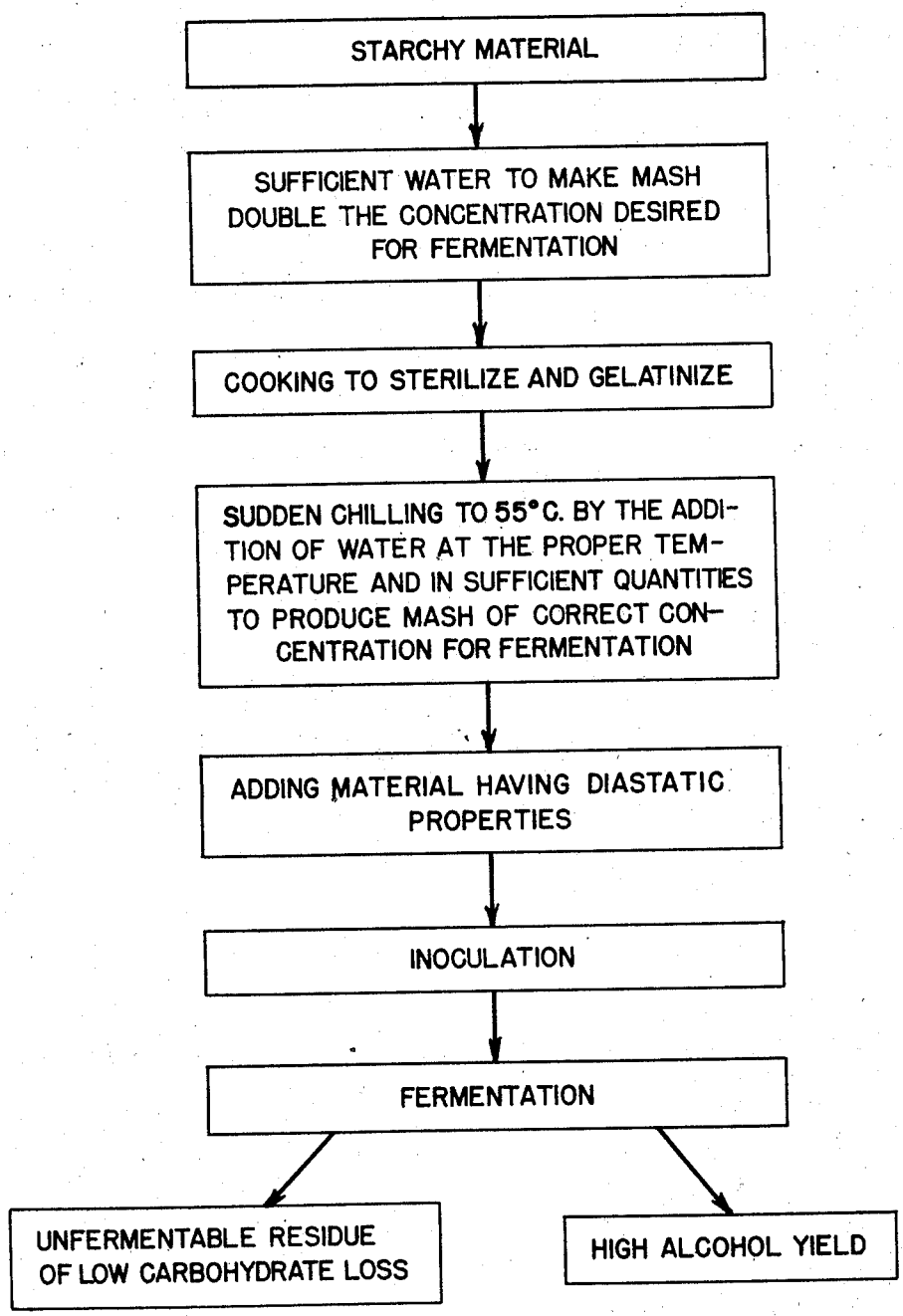

2,342,330

UNITED STATES PATENT OFFICE 2,342,330

METHOD OF SACCHARIFYING STARCHY MATERIALS

Leo M. Christensen, Moscow, Idaho, assignor to National Agrol Company, Inc., New York, N. Y., a corporation of Delaware Application October 2, 1940, Serial No. 359,433

5 Claims. (Cl. 195—17)

This invention relates to a method for the production of alcohol from starchy materials, and more particularly to a method of saccharifying starchy materials, as illustrated in the accompanying drawing.

In producing alcohol from starchy materials, such as grains and tubers, the selected material is first subjected to a cooking step in the presence of water in order to hydrate and gelatinize the starch content thereby rendering it available to the action of saccharifying enzymes. Such cooking also serves to sterilize the mash.

Ordinarily, the starchy material is mixed with water to produce a concentration of approximately 15 to 20 grams of starch per 100 c. c. of mash, and this mash is cooked in a pressure cooker or other suitable vessel at a temperature of from 100 to 140° C. for a period of from thirty to sixty minutes. The cooked mash is then cooled by vacuum evaporation in the cooking vessel or by pumping it through a suitable cooler to reduce the temperature to about 55° C., at which temperature the saccharifying agent is added. This cooling ordinarily requires approximately sixty minutes.

I have found that changes take place during this cooling process which profoundly affect the course of saccharification. Apparently an irreversible hydration of the starch occurs with the result that there is a progressive increase in the amount of diastase needed for saccharification and a decrease in the yield of fermentable carbohydrates possible with the optimum ratio of diastatic material. This change commences when the mash temperature reaches about 80° C., there being practically no change at 100° C. Therefore, the time required to reduce the temperature from 80° C. to the saccharification temperature, which is approximately 55° C., is of great importance. As I have previously mentioned, sixty minutes is usually allowed for this cooling step.

One of the objects of my invention is to provide a method of saccharification by the use of which less diastatic material is required which comprises reducing the temperature of the mash after cooking to approximately 55° C. in fifteen minutes or less.

Another object of my invention is to provide a method of saccharification which will result in a greater alcohol yield comprising reducing the temperature of the mash after cooking to approximately 55° C. in fifteen minutes or less.

A further object of my invention is to provide a method of saccharification which results in a lower carbohydrate loss during processing which comprises reducing the temperature of the mash after cooking to approximately 55° C. in fifteen minutes or less.

With these and other objects in view, this invention embraces broadly the idea of providing a method of saccharification in which the mash is suddenly cooled after the cooking step. This sudden cooling decreases the amount of diastatic material necessary for complete fermentation, increases the yield of alcohol, and reduces the carbohydrate loss after processing.

In the preferred method of practicing my invention, the ground grain or tuber is mixed with sufficient water, at a temperature below that at which starch gelatinizes, to produce a mash of approximately double the concentration desired for the fermentation phase of the process. This slurry is then subjected to a temperature of 100 to 110° C. for a period of from thirty to sixty minutes in any suitable type of cooker.

After the cooking operation, sufficient water is added to produce the desired mash concentration. The water contains the required amount of diastatic material, such as barley malt, mold bran, or other materials described in my co-pending applications Serial No. 360,205, filed October 7, 1940, and Serial No. 360,206, filed October 7, 1940. This material is then rapidly and thoroughly mixed in order to obtain thorough contact between the diastatic enzymes and the starch particles.

An important feature of the process resides in the fact that the added water has been chilled sufficiently to produce immediately in the diluted mash a temperature of 55° C. This sudden reduction in temperature reduces the amount of diastatic material needed for saccharification, increases the yield of alcohol in the subsequent fermentation, and reduces the carbohydrate loss during the further processing.

The mash is then placed in a suitable tank where it is agitated and aerated occasionally for a period of from two to three hours. At the end of this time the mash may be pumped to the fermentation tank where it is inoculated.

The following material illustrates the changes that occur in cooked mash between the temperatures of 80° C. and 55° C. and reveals the importance of the step of rapid cooling. A convenient method for following these changes is afforded by the measurement of the mash viscosity.

The data shown in Table I below were obtained with mash containing one part of corn meal and six parts of water. The mash was cooked at 110° C. for one hour. In the case of the mash cooled slowly, approximately one hour was required for the reduction of the temperature to 55° C. At this point mold bran was added in the amounts indicated in the table and the mash was stirred to obtain proper mixing. The saccarifying mash was held at 55° C. for 90 minutes, and was then cooled to 30° C. and the relative viscosity measured by means of a pipet.

In the case of quick cooling, the mash was taken from the cooker and spread in a thin layer in a dish. Evaporation from the thin layer resulted in a reduction of the temperature to 55° C. in five minutes. Mold bran was then added as indicated in Table I, and the saccharifying mash was held 90 minutes to 55° C. as before, following which it was cooled to 30° C. Mash viscosity was measured as before.

Table 1

| Mold bran percentage of total dry matter | Relative viscosity of the mash (water =1) | |
|---|---|---|
| | Slow cooling | Rapid cooling |
| 2.0 | 114 | 16 |
| 4.0 | 66 | 24 |
| 5.9 | 60 | 34 |
| 7.6 | 61 | 35 |
| 9.4 | 62 | 39 |
| 13.5 | 100 | Above 100 |
| 16.7 | 400 | Above 100 |

In studies on potato mash, it has been found that viscosity measurements afford a convenient measure of the amount of saccharification which has taken place. Table 2 shows the effect of temperature on the relative viscosity of potato mash containing 12 g. (dry basis) of potatoes and 1.3 g. (dry basis) mold bran in 100 c. c. of the mash.

Table 2

| Saccharification temperature, centigrade degrees | Relative viscosity (water=1) |
|---|---|
| 75 | 25 |
| 65 | 21 |
| 58 | 19 |
| 55 | 15 |
| 47 | 22 |
| 45 | 25 |
| 39 | 35 |

This indicates an optimum temperature of about 55° C. The same temperature was found to be optimum for the saccharification of the common grain starches.

It is commonly believed that the fermentable sugar content of a mash being saccharified by a diastatic preparation, increases with the time it is held at the optimum saccharification temperature. The data in Table 3 show that this is not in accord with facts. Instead, a large amount of fermentable sugar is formed quickly. Then as the mash is allowed to stand for an hour, some of the fermentable sugars disappear and finally reappear after two hours.

Table 3

| Time of holding saccharifying mash at 55° C. | Relative viscosity |
|---|---|
| Zero | 6 |
| 15 minutes | 11 |
| 30 minutes | 19 |
| 60 minutes | 23 |
| 90 minutes | 16 |
| 120 minutes | 9 |

This indicates that the saccharifying mash should be held not less than 15 minutes or more than 120 minutes, and that the usual time of saccharification, 60 to 90 minutes, is the least desirable time of holding the mash at the optimum saccharification temperature.

This phenomenon is accompanied by a corresponding change in amount of unfermentable matter which can be recovered after the sugar is converted to ethyl alcohol and removed from the solution. In the production of ethyl alcohol from such materials as grains it is customary to evaporate the slops remaining after distillation of the ethyl alcohol to recover the valuable feeding materials such as proteins, vitamins, minerals and other unfermentable materials. It should be expected that unfermented carbohydrates resulting from incomplete saccharification or fermentation would also be recovered in this residue, but it has been found that only a part of such carbohydrate may thus be recovered. In orthodox procedures losses amounting to 10 to 12% of the total dry matter charged to processes are generally observed. This loss is apparently due to decomposition of the carbohydrate to carbon dioxide and water, through some little known chemical reactions of complex nature. Such losses are, of course to be avoided in commercial operations if possible. It was therefore of interest to note what effect the change in mashing procedure had upon this feed recovery, as well as its influence upon alcohol yield.

In Table 4 are shown the data obtained in the fermentation of mashes prepared with slow and with rapid cooling, and at several holding periods. In this case the corn meal was mixed with half the amount of water required to produce the desired final mash concentration and this mixture was cooked one hour at 110° C. This concentrated mash was then diluted with warm water in the case of the mash to be cooled slowly, or with cold water in the case of the mash cooled rapidly to saccharification temperature, 55° C. The amount of mold bran is shown in the table. The saccharifying mash was held at 55° C. for 90 minutes in the case of the slowly cooled mash, in accordance with standard procedure, or for 180 minutes in the case of the rapidly cooled mash. The fermenting mash was held at 30° C. for 90 hours. The alcohol was measured by the determination of the specific gravity of the distillate from a measured volume of the mash containing a known amount of grain, and the residual feed measured by evaporating the slops to dryness over a steam plate.

Table 4

| Mash concentration grams of corn per 100 c. c. of water | Time to cool mash to 55° C., minutes | Mold bran percentage of total dry grain to process | Alcohol percentage of total dry grain to process | Dry residue percentage of total dry grain to process |
|---|---|---|---|---|
| 17 | 60 | 2.0 | 34.9 | 32.0 |
| | | 4.0 | 37.1 | 31.8 |
| | | 5.9 | 37.1 | 31.8 |
| | | 7.6 | 36.4 | 31.5 |
| | | 9.4 | 33.0 | 33.3 |
| | | 13.5 | 30.8 | 33.7 |
| 17 | 5 | 0.1 | 18.6 | 57.3 |
| | | 0.2 | 22.3 | 59.5 |
| | | 0.5 | 27.7 | 50.2 |
| | | 1.0 | 32.1 | 39.7 |
| | | 1.5 | 35.2 | 34.1 |
| | | 2.0 | 38.2 | 31.0 |
| | | 4.0 | 37.1 | 30.8 |
| | | 5.9 | 35.9 | 31.2 |
| 28 | 5 | 0.2 | 27.8 | 49.2 |
| | | 0.5 | 27.5 | 49.4 |
| | | 1.0 | 31.9 | 40.6 |
| | | 2.0 | 35.1 | 36.5 |
| | | 4.0 | 35.9 | 34.2 |
| | | 6.3 | 32.9 | 32.8 |

The fermentation data thus are in agreement with the conclusions based upon viscosity measurements. When the cooked mash is quickly cooled much less diastatic material is required than is needed for the slowly cooled mash, and the alcohol yield is greater with the combination of rapid cooling and low diastatic material concentration than in the case of the slowly cooled mash and higher diastatic material concentration. Thus a double advantage is found for the rapid cooling. First the alcohol yield is improved and second a smaller amount of the relatively expensive diastatic material is needed.

An entirely unexpected third advantage was also found. In the case of the slowly cooled mash and higher diastatic material required the carbohydrate loss during processing was much greater than in the case of the combination of rapid mash cooling and smaller diastatic material concentration. With optimum conditions it was possible, using rapid mash cooling, to reduce the carbohydrate loss to practically zero.

It is important to note that with rapid mash cooling it is essential to use the optimum concentration of saccharifying agent. Studies like that reported in Table 4 were made with a number of grains, including several kinds of wheat, barley, rye, rice, oats, millet and grain sorghums. In every case the optimum mold bran concentration for mashes containing less than 20 gms. of dry matter per 100 cubic centimeters was between 2.0 and 2.5% of the total dry matter charged to process, but if mash concentrations were as high as 25 grams of grain per 100 cubic centimeters of water a little more mold bran was needed, usually about 3.0 to 3.5% of the total dry matter charged to process. But there are individual variations among the grains, and even variations among the samples of the same grain that require the careful determination of the optimum ratio in order to secure the full benefits of this method. It has been found that measurements of mash viscosity furnish a satisfactory laboratory procedure for the determination of the optimum ratio of mold bran to grain.

Fermentation experiments with potatoes and with cassava yielded similar data, but in each case the optimum mold bran requirement was between 4.0 and 5.0 gms. per 100 gms. of total dry matter charged to process, or almost exactly twice the amount needed for the grains. Again variations were found among the various samples used and thus it is necessary in these fermentations also to determine accurately the optimum proportion in order to secure the full benefits afforded by these processes. Carbohydrate losses in the case of deviations from optimum conditions had a particularly large effect upon feed recovery in the case of potatoes. In some cases losses amounting to as much as 28% of the total dry matter charged to process were observed, while with all conditions optimum the feed recovery was practically the theoretical.

While for purposes of illustration I have disclosed a method of rapidly reducing the temperature of cooked mash by introducing a quantity of chilled water, it is obvious that other methods of chilling the mash rapidly may be devised without departing from the scope of this invention.

I claim:
1. A method of saccharifying starchy materials in the production of alcohol comprising cooking the selected starchy material to sterilize and gelatinize the mass, reducing the temperature of the mash to a temperature of at least 55° C. with sufficient rapidity to prevent irreversible hydration of the starch, adding a diastatic material in substantially less than the normally required proportions and then maintaining the mash at the said temperature for a period within a range of from 15 to 60 minutes.

2. A method of saccharifying starchy materials in the production of alcohol comprising cooking the selected starchy material to sterilize and gelatinize the mass, reducing the temperature of the mash to a temperature of at least 55° C. in approximately 15 minutes to prevent irreversible hydration of the starch and then adding a diastatic material in substantially less than the normally required proportions.

3. A method of saccharifying starchy materials in the production of alcohol comprising mixing the starchy material with a sufficient quantity of water to produce a mash of approximately double the concentration desired for the fermentation phase of the process, cooking the resulting mixture to sterilize and gelatinize the mass, suddenly chilling the mash to a temperature of at least 55° C. within a period of approximately 15 minutes by reducing the concentration of the mash to a consistency suitable for fermentation by the addition of water which is sufficiently chilled to produce the desired temperature and then adding a diastatic material in substantially less than the normally required proportions.

4. A method of saccharifying starchy materials in the production of alcohol comprising mixing the starchy material with a sufficient quantity of water to produce a mash of approximately double the concentration desired for the fermentation phase of the process, cooking the resulting mixture to sterilize and gelatinize the mass, suddenly chilling the mash to a temperature of at least 55° C. within a period of approximately 15 minutes by reducing the concentration of the mash to a consistency suitable for fermentation by the addition of water containing a diastatic material, said water being sufficiently chilled to produce the desired temperature, and said diastatic material being added in substantially less than the normally required proportions.

5. A method of saccharifying starchy materials in the production of alcohol comprising cooking the starchy material to gelatinize and sterilize the mass, reducing the temperature of the mash to at least 55° C. within a period of approximately 15 minutes, adding a diastatic material in substantially less than the normally required proportions and then maintaining the mash at the said temperature for a period within a range of from 15 to 60 minutes.

LEO M. CHRISTENSEN.